US009515462B2

(12) United States Patent
Capelli et al.

(10) Patent No.: US 9,515,462 B2
(45) Date of Patent: Dec. 6, 2016

(54) SHUTTER DEVICE FOR AN ELECTRICAL SWITCHGEAR PANEL, AND RELATED SWITCHGEAR PANEL

(71) Applicant: ABB Technology AG, Zurich (CH)

(72) Inventors: Fabio Capelli, Capizzone (IT); David Carera, Treviolo (IT); Carlo Gemme, Pavia (IT); Fabio Pellegrini, Bergamo (IT)

(73) Assignee: ABB Schweiz AG, Baden (CH)

( * ) Notice: Subject to any disclaimer, the term of this patent is extended or adjusted under 35 U.S.C. 154(b) by 57 days.

(21) Appl. No.: 14/560,116

(22) Filed: Dec. 4, 2014

(65) Prior Publication Data

US 2015/0083556 A1    Mar. 26, 2015

Related U.S. Application Data

(63) Continuation of application No. PCT/EP2013/059850, filed on May 13, 2013.

(30) Foreign Application Priority Data

Jun. 8, 2012   (EP) .................................... 12171301

(51) Int. Cl.
  *H02B 11/24*   (2006.01)
  *H02B 11/28*   (2006.01)
  (Continued)

(52) U.S. Cl.
  CPC ............... *H02B 11/24* (2013.01); *H01H 9/22* (2013.01); *H02B 11/02* (2013.01); *H02B 11/133* (2013.01); *H02B 11/28* (2013.01); *H02B 1/14* (2013.01)

(58) Field of Classification Search
  CPC .................. H02B 1/14; H02B 1/06; H02B 11/12–11/173; H02B 11/02; H01H 9/22
  (Continued)

(56) References Cited

U.S. PATENT DOCUMENTS 1,797,936 A  *  3/1931  Auringer ................. H02B 11/24
                                                    361/607
3,121,144 A  *  2/1964  Tjebben ................. H02B 11/24
                                                    200/50.22
(Continued)

FOREIGN PATENT DOCUMENTS

EP    0880208 A1    11/1998
EP    1962397 A1    8/2008
(Continued)

OTHER PUBLICATIONS

International Search Report (PCT/ISA/210) mailed on Jun. 28, 2013, by the European Patent Office as the International Searching Authority for International Application No. PCT/EP2013/059850.
(Continued)

Primary Examiner — Zachary M Pape
(74) Attorney, Agent, or Firm — Taft Stettinius & Hollister LLP

(57) ABSTRACT

A shutter device is disclosed for an electric switchgear panel, including a base configured to be placed on a bearing surface inside the switchgear panel, the base being adapted to support, positioned thereon, a current switching device movable between a connected position wherein the switching device is electrically connected to an associated electrical circuit and a disconnected position wherein the switching device is electrically separated from the corresponding electrical circuit, a frame having at least a portion which rises up transversally from the base and delimits a through aperture, a movable shutter operatively associated with the base and the frame and an actuating mechanism adapted to move the shutter between a first position where the shutter closes at least partially the through aperture and a second position wherein the shutter is retracted and leaves the through aperture at least partially opened.

21 Claims, 9 Drawing Sheets

(51) Int. Cl.
*H01H 9/22* (2006.01)
*H02B 11/02* (2006.01)
*H02B 11/133* (2006.01)
*H02B 1/14* (2006.01)

(58) Field of Classification Search
USPC .................................. 361/616–617; 439/113
See application file for complete search history.

(56) References Cited

U.S. PATENT DOCUMENTS

| | | | | |
|---|---|---|---|---|
| 3,295,025 | A * | 12/1966 | Tjebben | H02B 11/24 200/50.23 |
| 3,662,137 | A | 5/1972 | Cleaveland | |
| 4,146,915 | A * | 3/1979 | Yosida | H02B 11/24 200/50.22 |
| 4,723,917 | A | 2/1988 | Cournet et al. | |
| 4,818,822 | A | 4/1989 | Yahraus | |
| 8,288,669 | B2 * | 10/2012 | Capelli | H02B 11/127 200/50.24 |
| 8,366,460 | B2 * | 2/2013 | Jurek | H02B 11/24 361/647 |

FOREIGN PATENT DOCUMENTS

| | | |
|---|---|---|
| EP | 2148403 A1 | 1/2010 |
| EP | 2405545 A1 | 1/2012 |
| FR | 2214185 A1 | 8/1974 |
| JP | 54025442 A * | 2/1979 |
| WO | WO 2011/061579 A1 | 5/2011 |

OTHER PUBLICATIONS

Written Opinion (PCT/ISA/237) mailed on Jun. 28, 2013, by the European Patent Office as the International Searching Authority for International Application No. PCT/EP2013/059850.

International Search Report (PCT/ISA/210) mailed on Jun. 28, 2013, by the European Patent Office as the International Searching Authority for International Application No. PCT/EP2013/059849.

Written Opinion (PCT/ISA/237) mailed on Jun. 28, 2013, by the European Patent Office as the International Searching Authority for International Application No. PCT/EP2013/059849.

International Search Report (PCT/ISA/210) mailed on Jun. 28, 2013, by the European Patent Office as the International Searching Authority for International Application No. PCT/EP2013/059851.

Written Opinion (PCT/ISA/237) mailed on Jun. 28, 2013, by the European Patent Office as the International Searching Authority for International Application No. PCT/EP2013/059851.

* cited by examiner

SHUTTER DEVICE FOR AN ELECTRICAL SWITCHGEAR PANEL, AND RELATED SWITCHGEAR PANEL

RELATED APPLICATION(S)

This application is a continuation of International Application No. PCT/EP2013/059850 filed on May 13, 2013, and claims priority to European Patent Application No. 12171301.0 filed on Jun. 8, 2012, the entire content of both of which is incorporated herein by reference.

FIELD

The present disclosure relates to a shutter device for an electrical switchgear panel, and to a switchgear panel using such a shutter device.

BACKGROUND INFORMATION

The use of switchgear panels is known in the field of electrical distribution; from a structural point of view, known switchgear panels, which can be also indicated with the equivalent terms of electric switchboards, or switchgear or electric panels, or similar definitions, can include a metallic cubicle that is internally divided into several compartments or cells housing various apparatuses and equipment. For example, one compartment can house a switching unit, such as a circuit breaker, a second compartment can house main connections, such as bus-bars, feeding power from an electrical source, and a further compartment can house a system of cables suitable to be connected to a load, for example, an electrical motor.

The circuit breaker can be withdrawable or draw-out type, for example, the circuit breaker can be mounted on a truck and can be movable between two operative positions, namely, a first position wherein the circuit breaker is connected in input and output to corresponding contact pieces associated with a source side (for example, bus-bars) and load side (for example, other conductors or cables), respectively, of a circuit to which it is associated, and a second position wherein the circuit breaker can be electrically disconnected (withdrawn position) from both the input and output contact pieces.

In order to help ensure a suitable safety, a shutter device can be associated with the circuit breaker. Such known shutter devices can include one or more metallic or insulating components, for example, panels, which are movable, through rather complicated mechanisms actuated following the movement of the truck, from a non-protective position, for example, raised, where the contact pieces are accessible by the contacts of the circuit breaker, to a protective or segregating position, for example, lowered, where they shield the contact pieces connected to the power source and the load and make them inaccessible to the contacts of the circuit breaker and to operators for their safety.

Although known shutter devices can perform quite satisfactorily, they can be improved. For example, the movement of the movable partitioning walls or shutter panels can be actuated through complex and cumbersome mechanisms which most of the times are adapted "ad hoc" for the specific application. In addition, such movement can be dependent on the stroke, inside the switchgear, of the circuit breaker and related truck on which it is mounted.

These issues can be important when executing retrofitting or maintenance operations on previously installed switchgears. For example, an installed circuit breaker should be replaced by a functionally equivalent device once reaching its end of life, which may last several years.

Such replacements can be an issue, for example, because the circuit breaker to be replaced is old and no longer produced by the original manufacturer, or because the user wishes to use circuit breakers from different manufacturers.

Accordingly, compatibility issues may arise between the new circuit breaker to be used and the structural and/or functional characteristics of the existing switchgear panel into which the new circuit breaker has to be installed. For example, the distance between the pre-existing contact pieces of the electric circuit may be totally different and unsuitable with respect to the distance of the corresponding input and output connection contacts of the circuit breaker.

One rather expensive solution is to replace the entire switchgear panel, instead of retrofitting the switchgear panel by replacing only the circuit breaker.

Another solution can be to replace the old circuit breaker with a new one modified on a case by case in order to customize it with the specific existing switchgear panel, or in alternative, modifying the existing switchgear panel in order to adapt it to the new circuit breaker under installation.

As a consequence, the entire shutter device and related actuating mechanism may have to be replaced or the new circuit breaker may have to be customized to fit and operate the shutter device and related actuating mechanism in the existing switchgear panel to perform the safety function.

Such a customized approach can use extensive qualified resources and can face practical problems, for example, an ad-hoc solution for each retrofit intervention may need to be designed including knowing the specific dimensions and functionalities of the original circuit breaker and/or related panel.

SUMMARY

A shutter device is disclosed for an electric switchgear panel, the shutter device comprising: a base configured to be placed on a bearing surface inside a switchgear panel, the base being configured to support a current switching device, which is movable between a connected position wherein the switching device is electrically connected to an associated electrical circuit and a disconnected position wherein the switching device is electrically separated from the associated electrical circuit; a frame having at least a portion which rises up transversally from the base and delimits a through aperture; a movable shutter operatively associated with the base and the frame; and an actuating mechanism connected to move the shutter between a first position where the shutter closes at least partially the through aperture to prevent electrical connection of the current switching device with the electrical circuit and a second position wherein the shutter is retracted and leaves the through aperture at least partially opened for allowing electrical connection of the current switching device with the electrical circuit.

An electrical switchgear panel is disclosed comprising: a cabinet; and a shutter device, which is positioned inside the cabinet, the shutter device including: a base configured to be placed on a bearing surface inside the switchgear panel, the base being configured to support a current switching device which is movable between a connected position wherein the switching device is electrically connected to an associated electrical circuit and a disconnected position wherein the switching device is electrically separated from the associated electrical circuit; a frame having at least a portion which rises up transversally from the base and delimits a through aperture; a movable shutter operatively associated with the base and the frame; and an actuating mechanism configured to move the shutter between a first position where the shutter closes at least partially the through aperture to prevent the electrical connection of the current switching device with the electrical circuit and a second position wherein the shutter is retracted and leaves the through aperture at least partially opened for allowing electrical connection of the current switching device with the electrical circuit.

BRIEF DESCRIPTION OF THE DRAWINGS

The subject matter of the disclosure will be explained in more detail in the following text with reference to exemplary embodiments, which are illustrated in the attached drawings, in which.

DETAILED DESCRIPTION

In accordance with an exemplary, a shutter device is disclosed for an electric switchgear panel, wherein the shutter device can include a base suitable to be placed on a bearing surface inside the switchgear panel, the base being adapted to support, positioned thereon, a current switching device movable between a connected position wherein the switching device is electrically connected to an associated electrical circuit and a disconnected position wherein the switching device is electrically separated from the corresponding electrical circuit, a frame having at least a portion which rises up transversally from the base and delimits a through aperture, a movable shutter operatively associated with the base and the frame and an actuating mechanism adapted to move the shutter between a first position where the shutter closes at least partially the through aperture preventing the electrical connection of the current switching device with the electrical circuit and a second position wherein the shutter is retracted and leaves the through aperture at least partially opened for allowing the electrical connection of the current switching device with the electrical circuit.

In the figures, a shutter device according to the present disclosure is indicated by the overall reference number 100.

In accordance with an exemplary embodiment, the shutter device 100 can be suitable to be used in a switchgear panel 200 which can include, a cubicle or cabinet 201 having a plurality of walls which define an inside volume. For the sake of clarity of illustration, in the figures some walls of the cabinet 201 have been removed in order to better show the internal parts of the cabinet 201.

Figure 1:
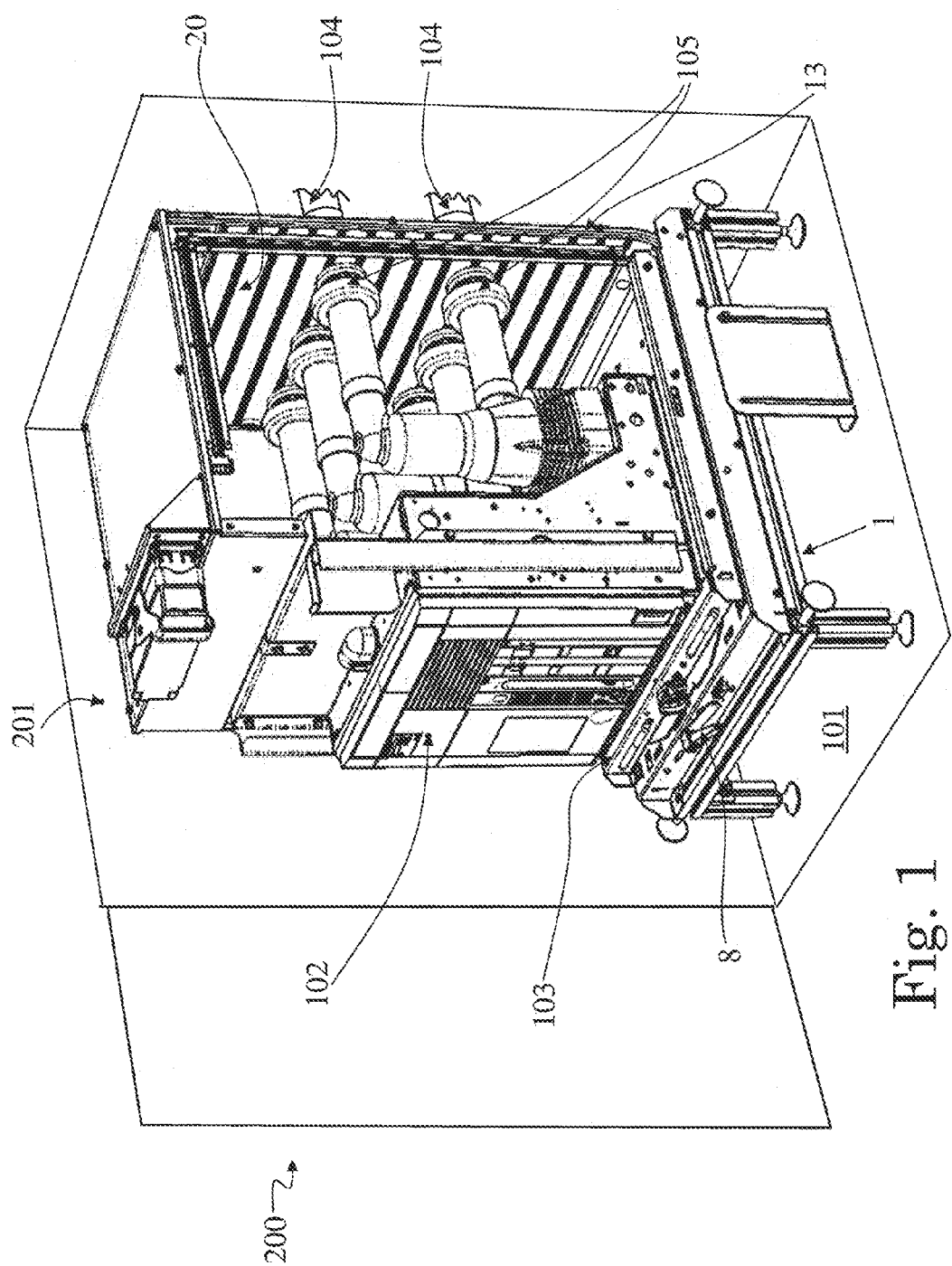
FIG. 1 is a perspective view showing an exemplary shutter device according to the present disclosure, in a first closed position.
Figure 2:
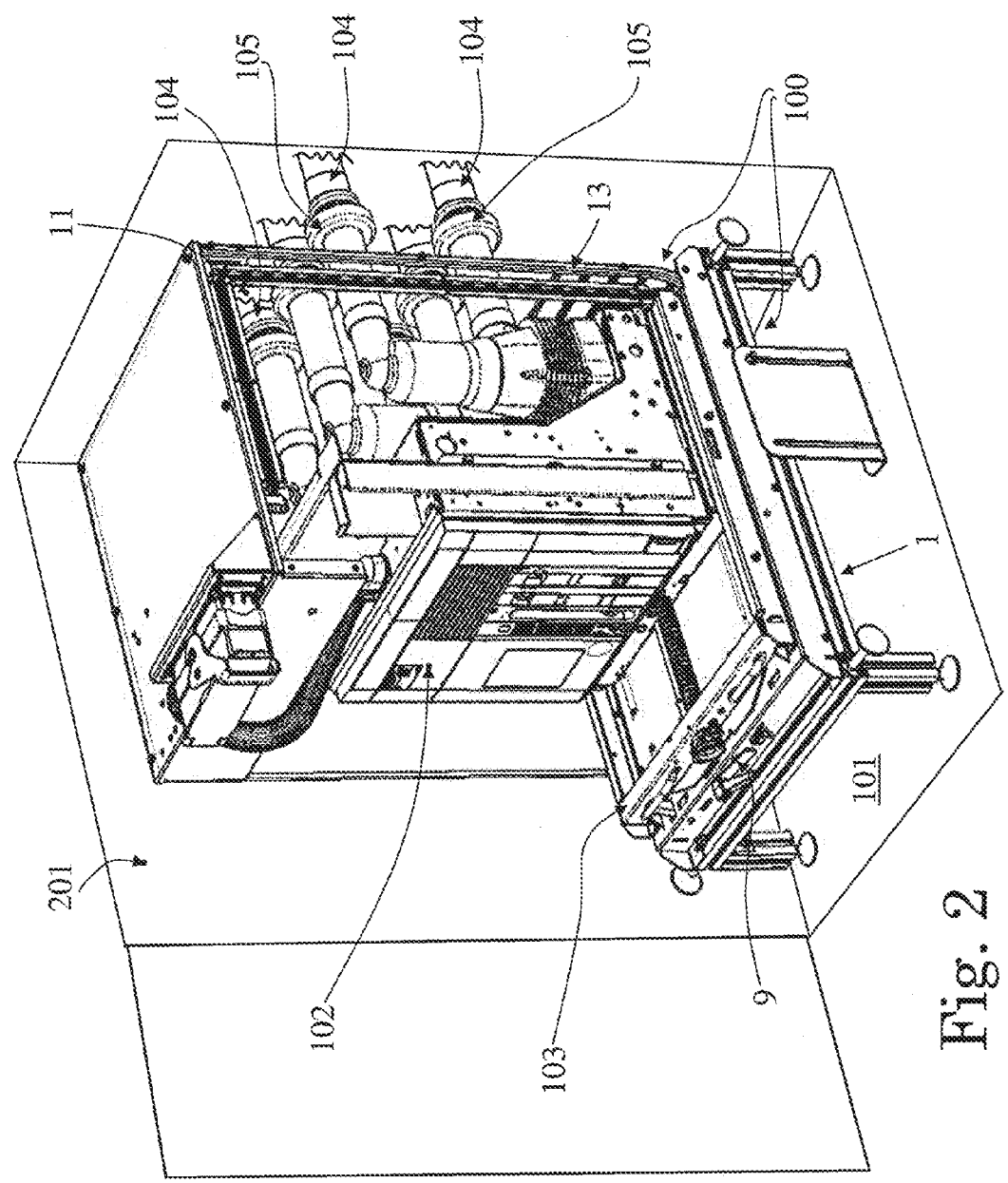
FIG. 2 is a perspective view showing an exemplary shutter device according to the present disclosure, in a second open position.
Figure 3:
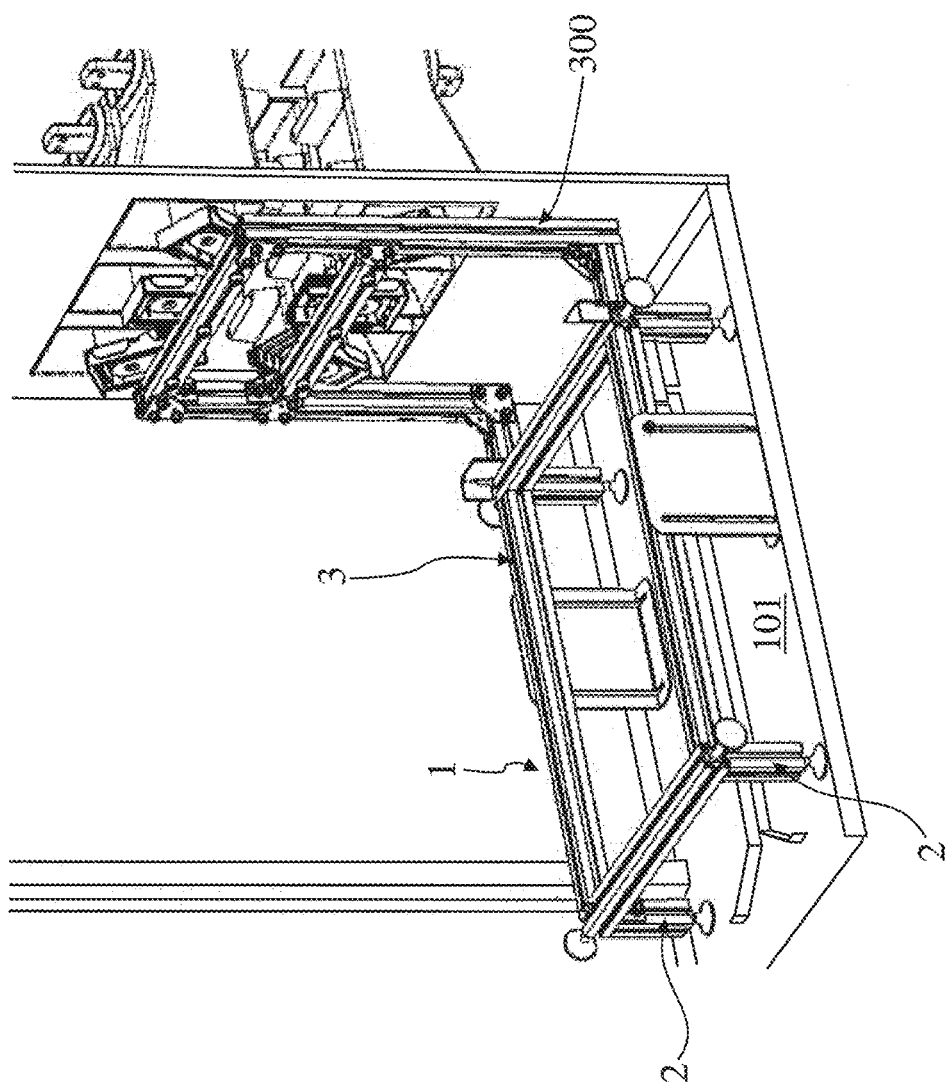
FIG. 3 is a perspective views illustrating components of the exemplary shutter device of FIGS. 1 and 2.

The inside volume of the cabinet 201 can be divided into one or more compartments suitable to accommodate various electrical or electronic equipment and/or devices, for example, one compartment can be devoted to accommodate a current switching device 102, an example of which is illustrated in FIGS. 1 and 2.

In the exemplary embodiment illustrated in FIGS. 1 and 2, the current switching device 102 can include a three-phase medium voltage circuit breaker, which can be mounted on a movable truck 103, and, for example, sliding, between a connected position (FIG. 2) wherein the switching device 102 is electrically connected to an associated electrical circuit 104 and a disconnected or withdrawn position (FIG. 1) wherein the switching device 102 is electrically separated from the corresponding electrical circuit 104.

The electrical circuit 104 is schematically represented in FIGS. 1 and 2 by two sets of contacts 104 which can be electrically connected, for example, to a power source (upper set of contacts) and a load (lower set of contacts), respectively.

In accordance with an exemplary embodiment, the current switching device 102 can include different types and/or combination of current making or breaking switching devices, for example, contactors with or without fuses, SF6 or vacuum circuit breakers.

In accordance with an exemplary embodiment, the shutter device 100 can include a base 1 which can be suitable to be placed, inside the switchgear panel, on a bearing surface 101, for example, the floor of the cabinet 201, and is adapted to support, positioned thereon, the current switching device 102 with its associated truck 103, a frame 10 having at least a portion which rises up transversally, for example substantially vertically, from the base 1 and delimits a through aperture 11, a movable shutter 20 which can be operatively associated with the base 1 and the frame 10, and an actuating mechanism, indicated in the figures by the overall reference number 30, which can be adapted to move the shutter 20 between a first position, illustrated in FIG. 1, where the shutter 20 closes at least partially, for example, completely, the through aperture 11 thus preventing the electrical connection of the current switching device 102 with the electrical circuit 104 and providing protection for personnel safety, and a second position, illustrated in FIG. 2, wherein the shutter 20 is retracted and leaves the through aperture 11 at least partially opened, for example, completely opened for allowing the electrical connection of the current switching device 102 and its contacts (for example, finger cluster) 105 with the electrical circuit 104.

In accordance with an exemplary embodiment, in the shutter device 100 according to the present disclosure, the actuating mechanism 30 can be adapted to move the movable shutter 20 independently from the movement of the current switching device 102.

For example, the actuating mechanism 30 can be adapted to move the movable shutter 20 from the first closed position towards the second open position while the current switching device 102 (and also the truck 103 connected therewith) can be kept motionless, for example, substantially still, on the base 1. In accordance with an exemplary embodiment, the actuating mechanism 30 can include means for locking the shutter 20 in the first closed position up to when the switching device 102 is positioned on the base 1 in a predefined position.

In accordance with an exemplary embodiment, the base 1 can include means 2 for adjusting its positioning relative to the bearing surface 101. For example, once the current switching device 102 is positioned on the base 1, the positioning of the current switching device 102 can be adjusted, including, for example, the connection contacts 105, relative to the position of the contact pieces 104 to which it has to be electrically connected.

In accordance with an exemplary embodiment, the base 1 can include a plurality of adjustable feet 2 suitable to rest on the bearing surface 101 and on which there is mounted a placing frame 3. A basement 4 having, for example, a plurality of side walls 5 and a placing plate 6 for placing on it the truck 103 and the switching device 102, can be securely connected, for example, screwed, onto the placing frame 3. In the exemplary embodiment illustrated, two lateral guide rails 7 for the truck 103 are shown.

In accordance with an exemplary embodiment, the frame 10 can include a couple of rails each having one portion 12 positioned under the placing plate 6 along a corresponding side wall 5, and a second portion 13 which can raise up substantially vertically from the placing plate 6 up to a certain desired height. The two rails can be mounted, for example, along their portions 13, on supporting side walls 70 which can be connected by a transversal bar 71, while the first portion 12 can be connected, for example, screwed to the corresponding side walls 5. The rails can be formed, for example, by profiled metallic elements, and the frame 10 can constitute a guide for the shutter 20.

Figure 8:
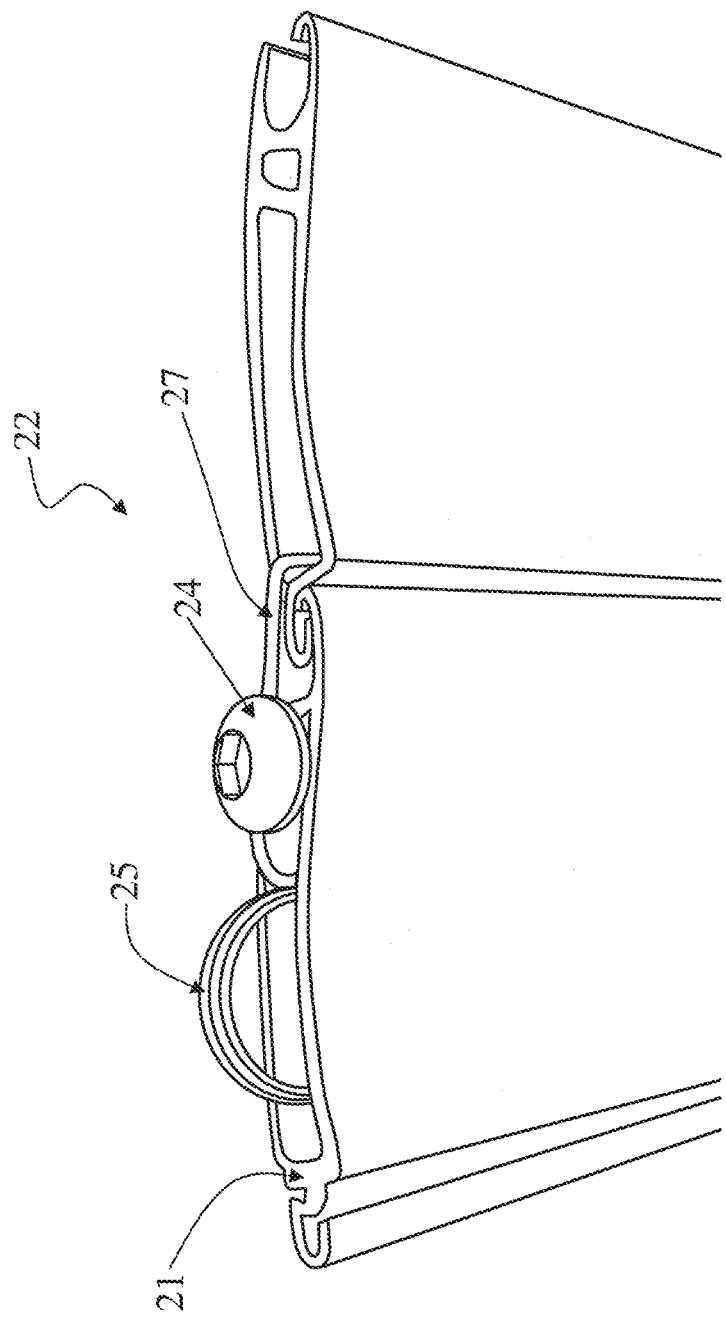
FIG. 8 shows an exemplary earthing device used in the shutter device according to the present disclosure.

In accordance with an exemplary embodiment, the shutter 20 can have a modular structure, for example, the shutter 20 can include a plurality of separate and substantially identical (or very similar) modules 21, which can be connected to each other. In the exemplary embodiment illustrated, for example, as shown in FIG. 8, such modules 21 can each have a hollow body, for example, bar-shaped. In accordance with an exemplary embodiment, a certain number of modules 21 can be cut and assembled together so as to have the desired size (in terms of width and total length) and can be mechanically connected to each other with their side ends inserted into the respective rails. The bars forming the modules 21 can, for example, be made of metal, for example, aluminum, which can be coated with electrically insulating paint or oxidized with an insulating layer.

In accordance with an exemplary embodiment, the shutter device 100 according to the present disclosure can include an earthing device 22 for connecting to ground potential the shutter device. For example, in the exemplary embodiment illustrated, the earthing device 22 can be operatively connected to the shutter 20. For example, as illustrated in FIGS. 8 and 9, the earthing device 22 can include an elastically deformable element 23, for example, a contoured spring which can be partially inserted inside one or more of the modules 21 and can be securely connected therewith by means of fixing means 24, for example, a self-screwing screw 24.

Figure 9:
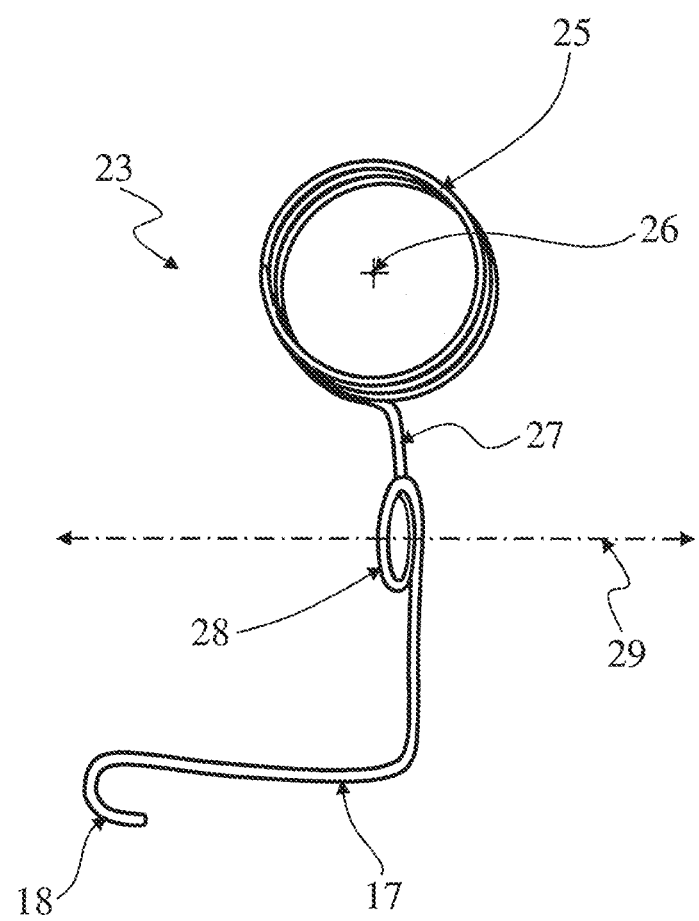
FIG. 9 shows an exemplary elastically deformable element used in the earthing device of FIG. 8.

In accordance with an exemplary embodiment, as illustrated in FIG. 9, the contoured spring 23 can include a first part 25 having one or more turns wound around an axis 26, a second part 27 departing from the first part 25 and forming one or more turns 28 wound around an axis 29 substantially perpendicular to the axis 26, and a third part 17, extending transversally from the second part 27, which ends with a hook-shaped portion 18.

In accordance with an exemplary embodiment, as shown in FIG. 8, the contoured spring 23 is inserted inside one the module 21 with the portion 25 partially protruding out. The hook-shaped end 18 can be hooked inside an adjacent module 21, and the turn 28 receives, passing there through, a self-screwing screw 24. The self-screwing screw 24, when installed, mechanically can fix the spring 23 to the shutter 20 and, while screwing, removes the insulating coat of layer thus realizing electrical contact between the shutter 20 and the spring 23. When the shutter 20 is installed with the ends of the modules 21 inserted into the guide rails 12, 13, the portion 25 makes contact with the rails, and therefore, can allow the entire shutter device 100 to connect to the ground potential.

Figure 5:
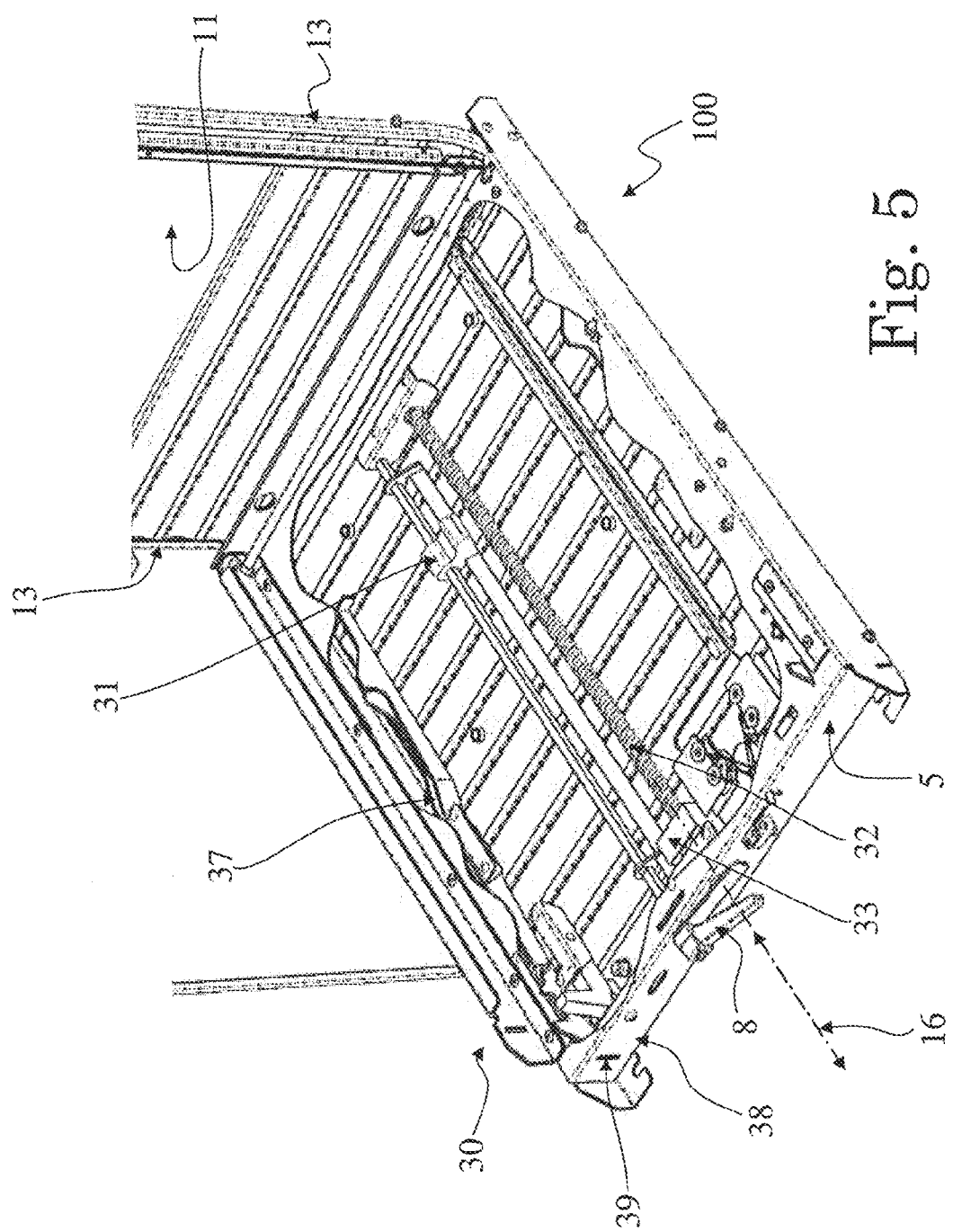
FIG. 5 is a perspective view illustrating exemplary components of an exemplary actuating mechanism used in the shutter device according to the present disclosure.
Figure 6:
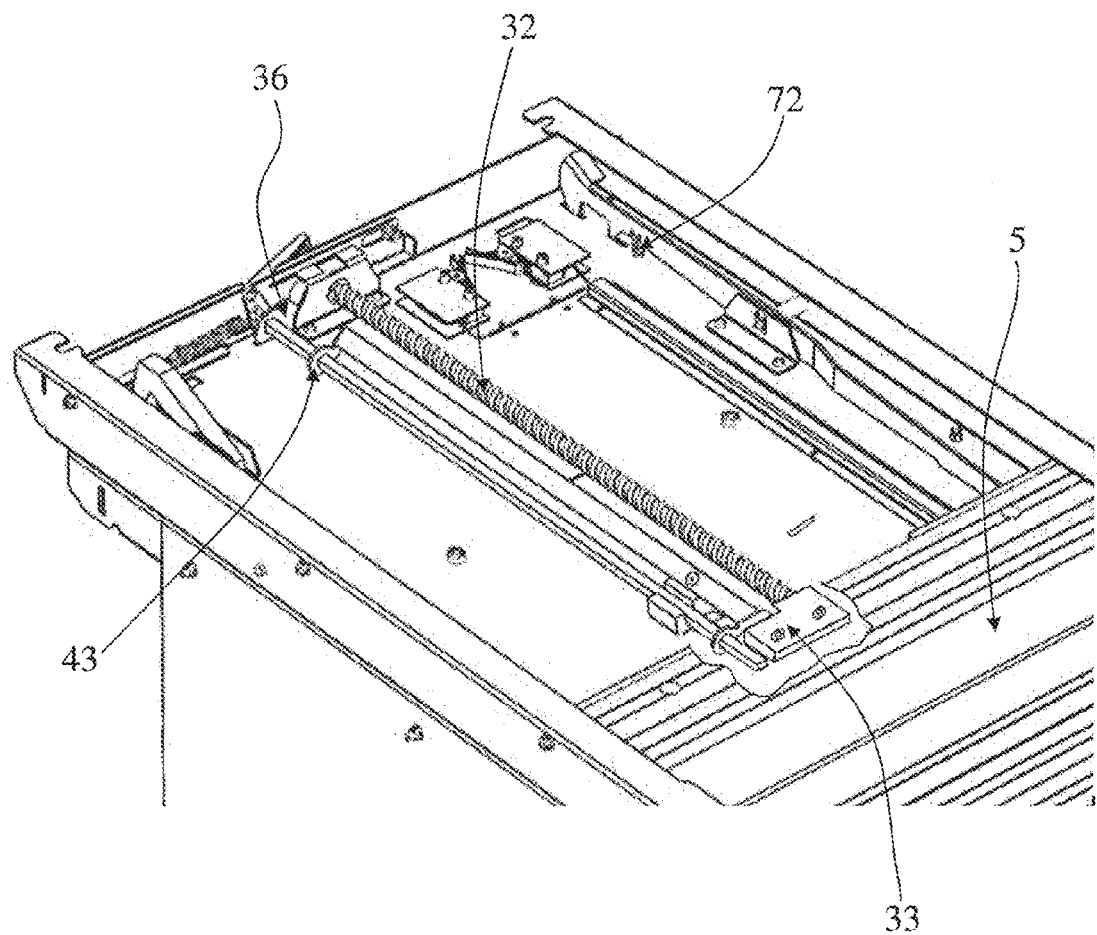
FIG. 6 is a perspective view showing exemplary components of FIG. 5 seen from a bottom view.
Figure 7:
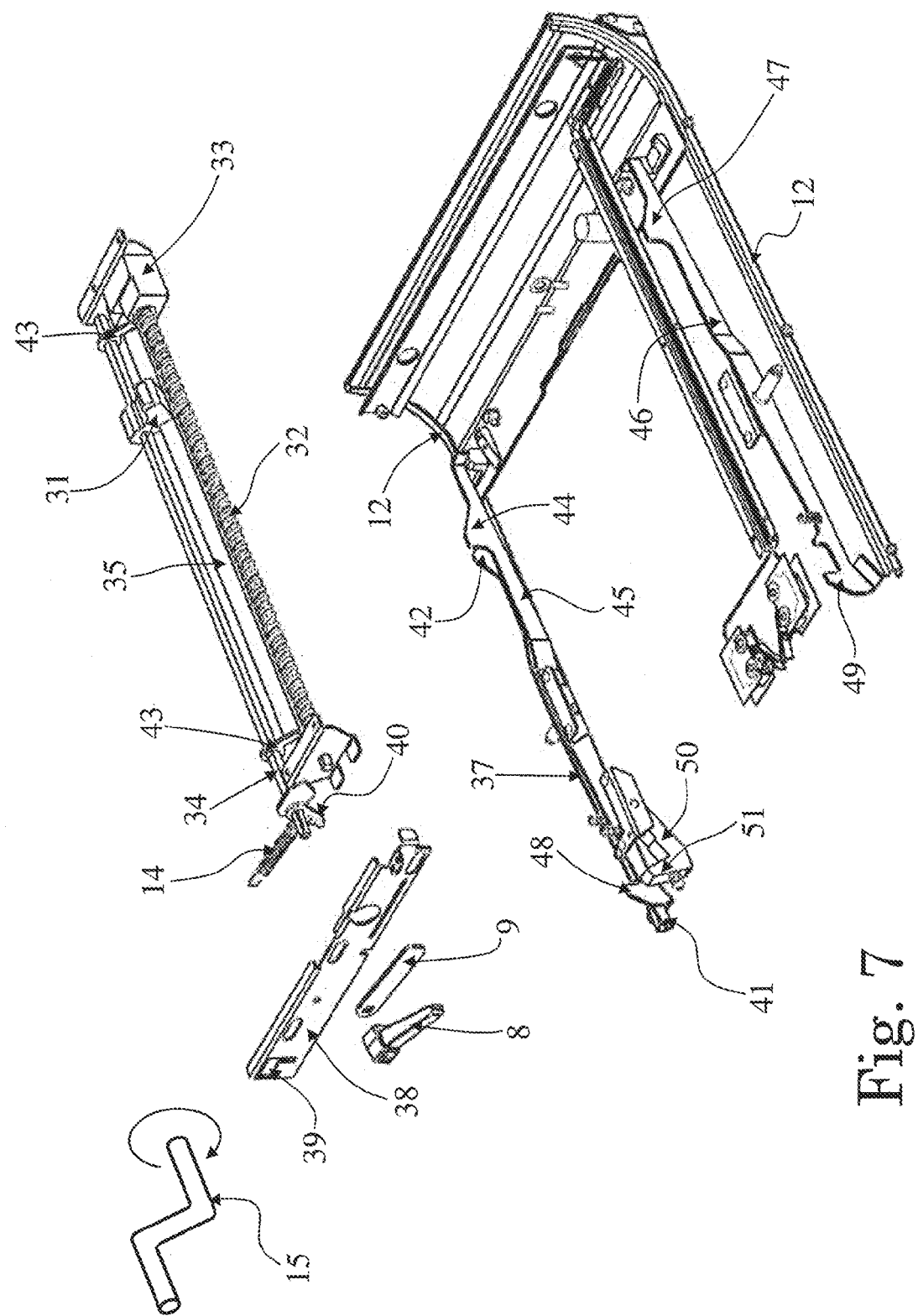
FIG. 7 is an exploded view of exemplary components illustrated in FIGS. 5 and 6.

As illustrated in FIGS. 5-7, the actuating mechanism 30 can include a docking element 31 suitable to interact with an associated portion of the switching device 102, and, for example, of the truck 103, so as to block the current switch device 102 motionless in its disconnected (withdrawn) position when the movable shutter 20 is moved from the first closed position up to the second open position.

The actuating mechanism 30 also can include a worm screw 32 which can be operatively connected to the shutter 20 and can be mechanically connected to the base 1, for example, to the front and back side walls 5 of the basement 4. In accordance with an exemplary embodiment, the worm screw 32 can be suitable to be actuated, namely rotated, by a tool, for example, the tool 15 schematically represented in FIG. 7, so as to cause movement of the shutter 20 between the first and second positions. For example, an actuating block 33 can be mounted on the worm screw 32. In accordance with an exemplary embodiment, the actuating block 33 can be connected to the shutter 20 and can move along the rotating axis 16 of the worm screw 32 so as to drag/push the shutter 20 between the first and second positions when the worm screw 32 is under actuation.

In accordance with an exemplary embodiment, the actuating mechanism 30 can include a first rod 34, for example, square-shaped, which can be pivotally connected to the base 1, for example, to the front and back side walls 5 of the basement 4, and a second rod 35 which can be connected to the first rod 34, for example, by means of two end wings 43, and rotates solidly with it between a raised position and a lowered position.

The docking element 31 can be mounted on at least the second rod 35 and can rotate with the at least second rod 35 between the raised and lowered position. In the exemplary embodiment illustrated, the docking element 31 can be mounted on both the first rod 34 and the second rod 35 and can rotate with the first and second rod 34, 35.

As illustrated, the first rod 34 and the second rod 35 can be positioned along a side of and can be substantially parallel to the worm screw 32 such that the actuating block 33, when dragging or moving the shutter 20 between the first and second positions, can act on the second rod 35 and keeps the shutter 20 in the raised position along a portion of its dragging path. In accordance with an exemplary embodiment, the docking element 31 can be kept raised and blocks the switching device 102 motionless in its disconnected (withdrawn) position when the movable shutter 20 is moved from the first closed position to the second open position. For example, the second rod 35 can have a length shorter than the worm screw 32 and the first rod 34, such that the actuating block 33, after dragging the shutter 20 either at a first position or at the second position and reaching the respective end-stroke position (see FIGS. 5 and 7), can disengage from and can allow the second rod 35 to rotate (together with the first rod 34) from the raised position to the lowered position. Accordingly, the docking element 31 can also lower down and can be disengaged from the switching device 102, which is now free to move from the disconnected (withdrawn) position the connected position.

In accordance with an exemplary embodiment, when the switching device 102 is in the connected position or in an intermediate position but not exactly in the end stroke disconnected position, the docking element 31 cannot rotate in the raised position since the docking element 31 can interfere with the truck 103 (or directly with a portion of the switching device 102), thus blocking the rotation of the first rod 34 and second rod 35, as well as of an handle 8 and an obstruction lever 9. In accordance with an exemplary embodiment, such condition can realize the interlock with the switching device that can enable access to operate the worm screw 32 and therefore to move the shutter 20 from its end stroke position only if the docking element 31 is free to rotate, for example, only when the switching device 102 is exactly in the desired disconnected position.

In accordance with an exemplary embodiment, a flap 36 can also be mounted on the first rod 34 and rotates with the first rod 34. For example, the flap 36 can be movable between a first position where the flap 36 crosses the placing plate 6 and hinders the introduction of an actuation tool (for example similar to the tool 15) devised to cause movement of the switching device 102 on its truck 103, for example towards the electrically connected position, and a second position where the movable flap 36 is lowered and the introduction of the actuation tool is permitted.

In accordance with an exemplary embodiment, the locking means of the actuating mechanism 30 can include a front bar 38 having a slot 39, for example, sliding along the front wall 5 of the basement 4. The handle 8 and the obstruction lever 9 which can be on the front part of the front bar 38, and a returning lever 40 operatively associated with the front bar 38, and subject to the returning action of an associated spring 14. The returning lever 40 can be movable between a locked position where the returning lever 40 impedes to actuate the handle 8 and a freed position where the handle 8 can be actuated by a user.

In accordance with an exemplary embodiment, a locking lever 37 can be positioned on a side of and under the placing plate 6. For example, in the embodiment illustrated the locking lever 37 can include a locking portion 41 suitable to enter into the slot 39 so as to lock the movable front bar 38 and the returning lever 40 up to when the switching device 102 is positioned on the base 1 in a predefined position, and an unlocking protrusion 42, raising up from the base 1, and, for example, passing through the placing plate 6, which is suitable to mechanically interact with a corresponding portion of the switching device 102, and, for example, of the truck 103 so as to disengage the locking portion 41 from the slot 39 and allow movement of the front bar 38 and of the returning lever 40 when the switching device 102 has reached the predefined disconnected position. In accordance with an exemplary embodiment, the locking lever 37 can prevent from operating the shutter 20 from its end stroke closed position if a switching device 102 is not inserted, thus preventing opening of the shutter 20 and access to the electrical circuit 104, helping ensure protection for personnel safety.

In accordance with an exemplary embodiment, the locking means can include at least one end-stroke block 44 positioned along the base 1 at the predefined disconnected position for the switching device 102 preventing movement of the switching device 102 towards its connected position if the shutter 20 has not reached its end stroke position, as for example illustrated in FIG. 5.

For example, in the exemplary embodiment illustrated, two side levers 45, 46 can be provided. The first side lever 45 can be positioned, under the placing plate 6, close to the locking lever 37 and can run parallel to placing plate 6. The first side lever 45 can include the end-stroke block 44, which can emerge through the placing plate 6. The second side lever 46 can also be positioned under the placing plate 6 and runs parallel to one side wall 5 of the basement 4, and can include a further end-stroke block 47 passing through the placing plate 6. Further, each of the side levers 45, 46 can include a corresponding block 48, 49 positioned at the front side of the base 1. In accordance with an exemplary embodiment, in the exemplary embodiment illustrated, there can be a blocking element 51, represented in FIG. 7 as part of an elbow shaped lever 50, which is also positioned under the pacing plate 6 and has the portion 51 protruding through the placing plate 6. The blocks 48, 49 and 51 can contribute to keep the switching device 102 and related truck 103 placed on the placing plate 6 until the actuation of the shutter 20 is completed and the aperture 11 is definitely closed. In accordance with an exemplary embodiment, the flap 36 in its first position can hinder the extraction from the placing plate 6 of the switching device 102 while the shutter 20 is under operation until the blocks 48, 49 and 51 is into a locking position.

Figure 4:
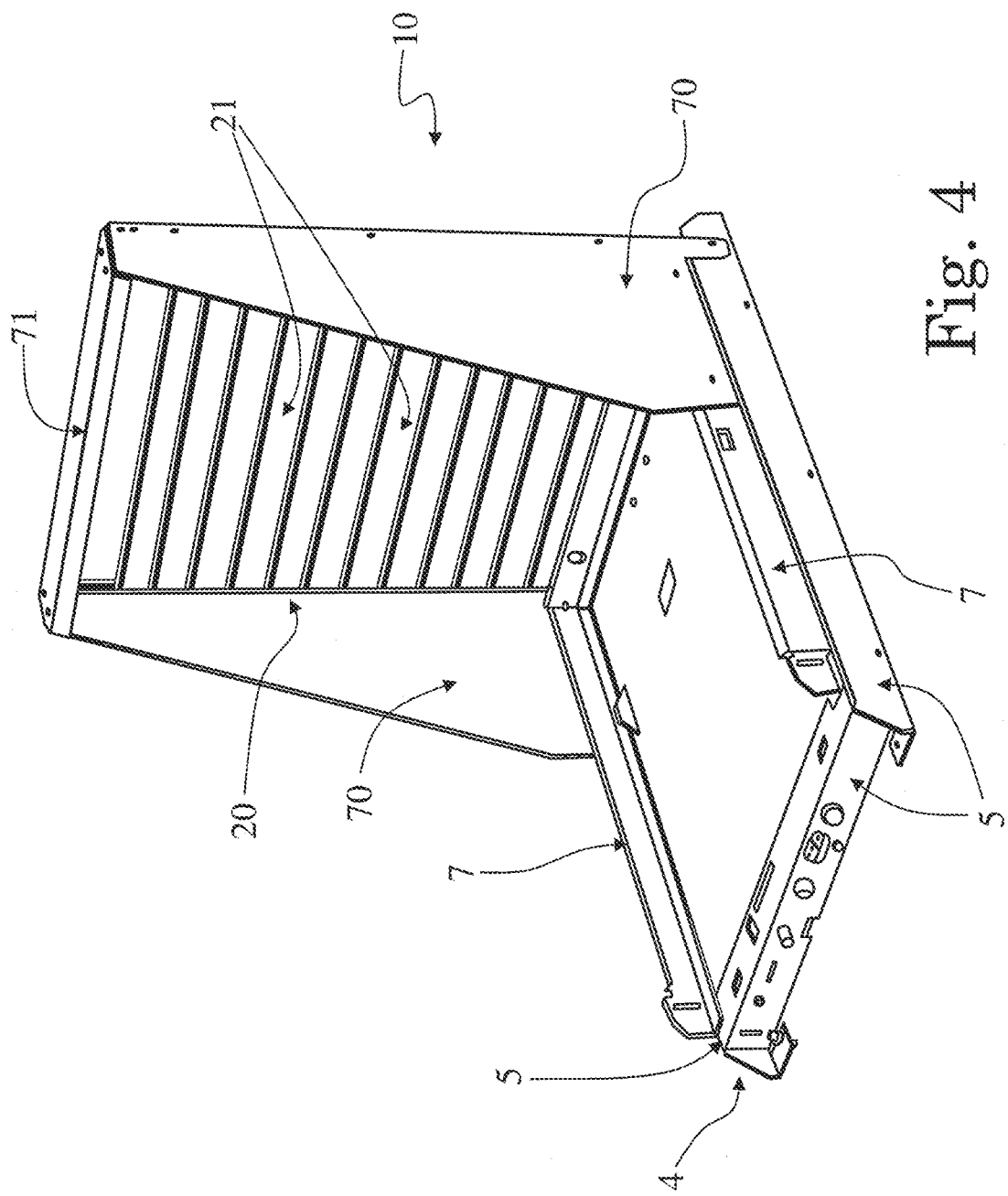
FIG. 4 is a perspective views illustrating components of the exemplary shutter device of FIGS. 1 and 2.

In accordance with an exemplary embodiment, once the shutter device 100 has been installed in a cabinet 201, the base 1 can be regulated by means of the adjustable feet 2 so as to bring the base at the desired position. For example, such operation can be executed with the help of, for example, one or more dimes and/or position jigs 300. Then, starting, for example, from a condition of shutter device 100 fully closed, for example, the shutter 20 fully closes the aperture 11, as for example illustrated in FIG. 4, a truck 103 with the switching device 102 can be positioned on the placing plate 6 with the blocks 48, 49, 51 being lowered.

In accordance with an exemplary embodiment, the actuating mechanism 30 can be blocked by the locking lever 37, and, for example, by the locking protrusion 41 engaged into the slot 39. When the switching device 102 reaches the predefined disconnected position (see for example, FIG. 1) on the placing plate 6, for example, when arriving at the block(s) 44, 47, the truck 103 or part of the switching device 102 can push down the unlocking protrusion 42, which in turn can cause the locking protrusion 41 to disengage from the slot 39. Accordingly, the returning lever 40 and the front bar 38 can slide laterally and free the actuation of the handle 8. In accordance with an exemplary embodiment, a user can rotate the handle 8 and the obstruction lever 9 moves as well, thus access to the worm screw 32 is allowed for the tool 15. In accordance with an exemplary embodiment, the first rod 34 and the second rod 35 rotate thus bringing the docking element 31 to raise and block the truck 103 and switching device 102 in the predefined disconnected position. By using the tool 15 and rotating the worm screw 32, the actuating block 33 can drag (or move) the shutter 20 towards the front and during this movement can keep the second rod 35 in the raised position with the docking element 31 engaged with a lower part of the truck 103 (or of the switching device 102).

In accordance with an exemplary embodiment, when the actuating block 33 reaches the end stroke position, illustrated for example in FIG. 5, the shutter 20 fully opens the aperture 11 which means that there is a continuous and free space for the connection contacts 105 within the frame 10 to mate with the corresponding contacts 104. Further, when the actuating block 33 reaches this end stroke position, it is disengaged from the second rod 35, which therefore can rotate together with the first rod 34 and disengages the docking element 31 from the truck 103 or the switching device 102.

Further, the one or more blocks 48, 49, 51 can be raised and impede removal of the switching device 102 from the placing plate 6, thus preventing access to the electrical circuit 104 and helping ensure adequate protection for personnel safety (see for example FIG. 2). In addition, the blocks 44, 467 can be lowered and stop blocking the movement of the switching device 102 from the disconnected position towards the connected one.

In accordance with an exemplary embodiment, the flap 36 can rotate with the first rod 34 and gives free access for a tool, like the tool 15. For example, in practice, according to known solutions in the art, the truck 103 can include an actuation mechanism with a worm screw for actuating the switching device 102. For example, in this condition, a user can rotate the worm screw of the truck 103 thus moving the current switching device 102 until the connection contacts 105 mate with the contact pieces 104 as shown in FIG. 2. When the current switching device 102 has to be removed, a user can again rotate the worm screw of the truck 103 until the current switching device reaches the end stroke front position as, for example, illustrated in FIG. 1. In this position, one or more of the blocks 48, and/or 49, and/or 51, block the truck and prevent the truck and the switching device 102 mounted thereon from being removed until the shutter 20 fully closes the aperture 11. For example, a user can rotate the handle 8 thus rotating the first rod 34 and the second rod 35, which can bring the docking element 31 to block the truck 103 (and hence the switching device 102 in the actual disconnected position). Then the user rotates the worm screw 32 in the opposite direction, and accordingly, the actuating block 33 moves along the axis 16 towards the back part and during this movement, can keep the second rod 35 raised with the docking block 31 engaged with the truck 103. When the actuating block 33 reaches its opposite end stroke, as, for example, illustrated in FIG. 6, the shutter 20 closes the aperture 11. In accordance with an exemplary embodiment, in this position the actuating block 33 can disengage from the second rod 35, and hence, the second rod 35 and the first rod 34 can rotate thus disengaging the docking element 31 and returning to the lowered position. The spring 14 can recall the lever 40, which in turn brings the front bar 38 to re-engage with the locking protrusion 41. One or more of the blocks 48, 49, 51 can be unlocked and lowered by one or more associated recalling springs 72 on levers 45, 46 and on actuating elements 73 placed, for example, on the first module of the shutter 20, and the truck 103 together with the switching device 102 can be safely removed, if needed.

In accordance with an exemplary embodiment, the shutter device 100 according to the present disclosure can provide improvements over known devices according to a solution, which can be modular, adjustable, and compact. For example, the shutter device according to the specific applications can be easily sized, and where many components can be standardized and produced in series, and/or can be used with minor size modifications. Further, the shutter 20 can completely close the through aperture 11, makes withdrawing operations relatively safe, while the aperture 11, and for example, the access space between the connection contacts 105 of the switching device 102 and the corresponding circuit contacts 104 is fully open and relatively free from obstacles, which can render operations easier and dielectric design safer. In addition, the opening/closing of the shutter 20 can be independent from and does not need any movement of the current switching device 102 (or of the related truck 103), and a shutter device with a very compact overall dimensions and usable in panels having a limited depth can be realized.

In accordance with an exemplary embodiment, the shutter device 100 according to the present disclosure can be suitable to be used, for example, in any suitable switchgear panel, and, for example, for retrofitting exiting switchgear panels.

In accordance with an exemplary embodiment, the present disclosure also relates to a switchgear panel 200 including a cabinet 201, and wherein the switchgear panel 200 can include a shutter device 100 as disclosed, which can be positioned inside the cabinet 201.

In accordance with an exemplary embodiment, the shutter device disclosed can be susceptible of modifications and variations, all of which are within the scope of the inventive concept including any combination of the above described embodiments which have to be considered as encompassed by the above description; all details may further be replaced with other technically equivalent elements. For example, the various components of the actuating mechanism may be differently shaped, provided they are suitable for the scope they were conceived, or differently positioned and or differently mutually associated. For example, in FIG. 4 the frame 10 is shown provided with the two lateral plates 70, which can be omitted or modified to from a closed cassette solution; the earthing elastic element 23 can be formed by a different element other than the depicted spring, or even the spring can have a different shape. In accordance with an exemplary embodiment, the materials, so long as they are compatible with the specific use, as well as the individual components, may be any according to the specifications and the state of the art.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A shutter device for an electric switchgear panel, the shutter device comprising:
   a base configured to be placed on a bearing surface inside a switchgear panel, the base being configured to support a current switching device, which is movable between a connected position wherein the switching device is electrically connected to an associated electrical circuit and a disconnected position wherein the switching device is electrically separated from the associated electrical circuit;
   a frame having at least a portion which rises up transversally from the base and delimits a through aperture;
   a movable shutter operatively associated with the base and the frame; and
   an actuating mechanism connected to move the shutter between a first position where the shutter closes at least partially the through aperture to prevent electrical connection of the current switching device with the electrical circuit and a second position wherein the shutter is retracted and leaves the through aperture at least partially opened for allowing electrical connection of the current switching device with the electrical circuit;

wherein the actuating mechanism is configured to move the movable shutter from the first position to the second position while the current switching device is kept motionless on the base.

2. The shutter device according to claim 1, wherein the actuating mechanism comprises:
   means for locking the shutter in the first position up to when the switching device is positioned on the base in a predefined position.

3. The shutter device according to claim 2, wherein the locking means comprise:
   a movable front bar having a slot;
   a cam lever operatively associated with the front bar; and
   a locking lever which includes a locking portion configured to enter into the slot so as to lock the movable front bar and prevent the cam lever and the front bar to move from a locked position up to when the switching device is positioned on the base in the predefined position.

4. The shutter device according to claim 3, wherein the locking lever comprises:
   an unlocking protrusion configured to interact with a corresponding portion of the switching device or of a truck on which the switching device is mounted so as to disengage the locking portion from the slot and allow movement of the front bar and of the cam lever from the locked position towards a freed position when the switching device has reached the predefined position.

5. The shutter device according to claim 3, comprising:
   a handle and an obstructing lever operatively connected to the first rod and the front bar.

6. The shutter device according to claim 3, wherein the locking means comprise:
   at least one end-stroke block positioned along the base at a predefined position for the switching device.

7. The shutter device according to claim 1, wherein the actuating mechanism comprises:
   a docking element configured to interact with an associated portion of the switching device or of a truck on which the switching device is mounted, and to render the switching device, or the truck on which the switching device is mounted, motionless when the movable shutter is moved from the first position to the second position.

8. The shutter device according to claim 7, wherein the actuating mechanism comprises:
   a worm screw which is operatively connected to the shutter and to the base, the worm screw being configured to be actuated by a tool so as to cause movement of the shutter between the first and second positions; and
   an actuating block which is operatively coupled to the worm screw, the actuating block being connected to the shutter so as to move the shutter between the first and second positions.

9. The shutter device according to claim 8, wherein the actuating mechanism comprises:
   a first rod pivotally connected to the base; and
   a second rod which is connected to the first rod, for rotating with the first rod between a raised position and a lowered position.

10. The shutter device according to claim 9, wherein the first rod and the second rod are positioned along a side of and substantially parallel to the worm screw such that the actuating block, when moving the shutter between the first and second positions, will act on the second rod and keep the second rod in the raised position along a portion of the moving path of the first rod.

11. The shutter device according to claim 10, wherein the second rod has a length shorter than the worm screw such that the actuating block, when reaching an end-stroke position after moving the shutter between the first and second positions, will disengage from and allow the second rod to rotate from the raised position to the lowered position.

12. The shutter device according to claim 10, wherein the actuating mechanism comprises:
   a flap which is mounted on the first rod and moves with the first rod between a first position configured to hinder the introduction of an actuation tool devised to cause movement of the switching device and/or of the truck on which the switching device is mounted and a second position where the introduction of the actuation tool is permitted.

13. The shutter device according to claim 9, wherein the docking element is mounted on at least the second rod for movement with the second rod between a raised position in which the docking element renders the switching device motionless when the movable shutter is moved from the first position to the second position, and a lowered position where the docking element is disengaged from the switching device.

14. The shutter device according to claim 13, wherein the docking element is mounted on at least the second rod to move with second rod in such a way that the movement of the docking element towards the raised position will be impeded when the switching device is in a position different from a predefined position.

15. The shutter device according to claim 1, wherein the base comprises:
   means for adjusting the position of the base relative to the bearing surface.

16. The shutter device according to claim 1, wherein the movable shutter has a modular structure.

17. The shutter device according to claim 16, wherein the movable shutter comprises:
   a plurality of hollow bars connected to each other.

18. The shutter device according to claim 17, comprising:
   an earthing device configured to ground the shutter device, wherein the earthing device includes an elastically deformable element which is partially inserted inside one or more of the plurality of hollow bars and is securely connected to the one or more of the plurality of hollow bars.

19. An electrical switchgear panel comprising:
   a cabinet; and
   a shutter device, which is positioned inside the cabinet, the shutter device including:
      a base configured to be placed on a bearing surface inside the switchgear panel, the base being configured to support a current switching device which is movable between a connected position wherein the switching device is electrically connected to an associated electrical circuit and a disconnected position wherein the switching device is electrically separated from the associated electrical circuit;
      a frame having at least a portion which rises up transversally from the base and delimits a through aperture;
      a movable shutter operatively associated with the base and the frame; and
      an actuating mechanism configured to move the shutter between a first position where the shutter closes at least partially the through aperture to prevent the electrical connection of the current switching device with the electrical circuit and a second position wherein the shutter is retracted and leaves the through aperture at least partially opened for allowing electrical connection of the current switching device with the electrical circuit;

wherein the actuating mechanism is configured to move the movable shutter from the first position to the second position while the current switching device is kept motionless on the base.

20. The shutter device according to claim 1, wherein the actuating mechanism comprises:

means for locking the shutter in the first position up to when the switching device is positioned on the base in a predefined position; and a docking element configured to interact with an associated portion of the switching device or of a truck on which the switching device is mounted, and to render the switching device, or the truck on which the switching device is mounted, motionless when the movable shutter is moved from the first position to the second position; and wherein the base comprises:

means for adjusting the position of the base relative to the bearing surface.

21. The shutter device according to claim 20, wherein the locking means comprise:

a movable front bar having a slot;

a cam lever operatively associated with the front bar; and a locking lever which includes a locking portion configured to enter into the slot so as to lock the movable front bar and prevent the cam lever and the front bar to move from a locked position up to when the switching device is positioned on the base in the predefined position;

wherein the actuating mechanism comprises:

a worm screw which is operatively connected to the shutter and to the base, the worm screw being configured to be actuated by a tool so as to cause movement of the shutter between the first and second positions; and an actuating block which is operatively coupled to the worm screw, the actuating block being connected to the shutter so as to move the shutter between the first and second positions;

wherein the movable shutter has a modular structure; and wherein the movable shutter comprises:

a plurality of hollow bars connected to each other.

\* \* \* \* \*